United States Patent
Natarajan et al.

(10) Patent No.: US 10,630,700 B2
(45) Date of Patent: Apr. 21, 2020

(54) PROBE COUNTER STATE FOR NEIGHBOR DISCOVERY

(71) Applicant: Hewlett Packard Enterprise Development LP, Houston, TX (US)

(72) Inventors: Venkatesh Natarajan, Bangalore (IN); Khiruthigai Balasubramanian, Bangalore (IN); Badrish Adiga HR, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 117 days.

(21) Appl. No.: 15/728,844

(22) Filed: Oct. 10, 2017

(65) Prior Publication Data

US 2018/0124074 A1    May 3, 2018

(30) Foreign Application Priority Data

Oct. 28, 2016 (IN) .............................. 201641037096

(51) Int. Cl.
*H04L 29/06* (2006.01)
*H04L 12/24* (2006.01)
*H04L 12/26* (2006.01)

(52) U.S. Cl.
CPC ...... *H04L 63/1416* (2013.01); *H04L 63/1441* (2013.01); *H04L 41/12* (2013.01); *H04L 43/0811* (2013.01)

(58) Field of Classification Search
CPC . H04L 63/1416; H04L 63/1441; H04L 41/12; H04L 43/0811
See application file for complete search history.

(56) References Cited

U.S. PATENT DOCUMENTS 6,980,552 B1 * 12/2005 Belz ..................... H04L 47/10
                                                      370/392
7,516,487 B1    4/2009 Szeto et al.
(Continued)

FOREIGN PATENT DOCUMENTS

| CN | 101222513 A | 7/2008 |
| EP | 2677716 A1 | 12/2013 |
| WO | WO-2012/100494 A1 | 8/2012 |

OTHER PUBLICATIONS

E. Nordmark et al., "FCFS SAVI: First-Come, First-Seived Source Address Validation Improvement for Locally Assigned IPv6 Addresses," Internet Engineering Task Force, Request for Comments: 6620, May 2012, pp. 1-35, IETF Trust.

(Continued)

*Primary Examiner* — Ayoub Alata
(74) *Attorney, Agent, or Firm* — Sheppard Mullin Richter & Hampton

(57) ABSTRACT

Examples disclosed herein relate to security actions that can be taken at a network appliance based on a received copy of a neighbor discovery packet. The neighbor discovery packet copy is received on a control plane of a network that originated at a port on a data plane of the network. The neighbor discovery packet copy includes identification information including an internet protocol address, a media access control address, and information about the port. The identification information is compared to a binding state table to determine that the internet protocol address and the media access control address match the binding state table, but the port does not match a previous port on the binding state table for the internet protocol address. A security action is performed.

20 Claims, 4 Drawing Sheets

(56) References Cited

U.S. PATENT DOCUMENTS

| | | |
|---|---|---|
| 9,088,608 B2 | 7/2015 | Thubert et al. |
| 2007/0130427 A1 | 6/2007 | Lahti et al. |
| 2007/0245417 A1* | 10/2007 | Lee .................... H04L 63/1458 726/22 |
| 2015/0249666 A1* | 9/2015 | Kato ....................... H04L 63/08 726/7 |

OTHER PUBLICATIONS

Huawei, "Enterprise Data Communication Products Feature Description—Security," Sep. 5, 2013, pp. 1-5, Huawei Technologies Co., Ltd.

J. Bi et al., "SAVI Solution for DHCP," draftietfsavidhcp12.txt, Feb. 8, 2012, pp. 1-26, Internet Draft, IETF Trust.

\* cited by examiner

PROBE COUNTER STATE FOR NEIGHBOR DISCOVERY

BACKGROUND

A network can include a variety of devices that transfer data throughout the network. This data is typically contained within packets that are transferred by switches, routers, or other network devices. A control plane can be used to control a data plane associated with the network.

BRIEF DESCRIPTION OF THE DRAWINGS

The following detailed description references the drawings, wherein.

DETAILED DESCRIPTION

Figure 1:
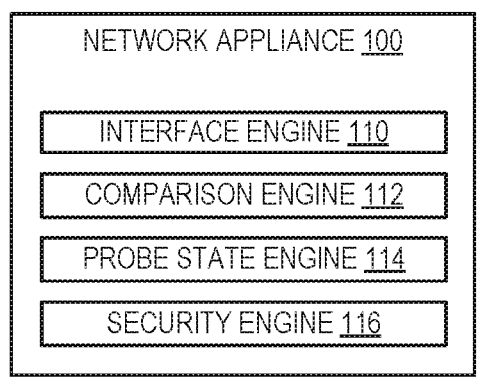
FIG. 1 is a block diagram of a network appliance capable of performing a security action based on a probe counter associated with a network discovery packet, according to an example.

The Internet Protocol (IP) is a communications protocol that is used for relaying data across network boundaries. The routing functionality of IP enables internetworking which can be used for the Internet. An IP address is a numerical identifier assigned to each device participating in a computer network that uses IP communication. The IP address can be used for location addressing and network interface identification. The IP version 4 (IPv4) address system is a 32 bit approach to IP addresses. The IP version 6 (IPv6) address system uses a 128 bit approach to IP addresses.

IPv6 is the most recent version of the Internet Protocol. The auto-configure feature in IPv6 allows a device to generate an IPv6 address as soon as it is given power. IPv6 host devices can configure themselves automatically when connected to an IPv6 network using a Neighbor Discovery (ND) Protocol. In various examples, ND Protocol can be responsible for one or more of the following: addressing auto configuration of nodes, discovery of other nodes on the link, determining the link layer addresses of other nodes, duplicate address detection, address prefix discovery, and maintaining reachability information about the paths to other active neighbor nodes. The ND Protocol can be vulnerable to various types of attacks. An example of a Neighbor Discovery Protocol implementation is the Neighbor Discovery Protocol described in Internet Engineering Task Force Request for Comments 4861.

As IPv6 becomes more popular, it may continue to grow as a target of attacks. One approach that can be used to control defense of a network using IPv6 is a feature called ND Snooping. This snooping feature can be based on the Internet Engineering Task Force Request for Comments 6620. The feature can be responsible for snooping all the ND packets and thereby maintain a Binding State Table (BST) that can be used for further validation of the hosts/clients on the network.

The feature causes switches in the network to copy the ND packets on a data plane to a network appliance on a control plane for inspecting whether the request is from a valid device and thus allowed. In one example, the valid devices can be programmed as a whitelist of entries in the hardware. Thus, data traffic from valid devices gets forwarded, whereas the data traffic from invalid devices gets blocked in the hardware. In certain examples, the network appliance can be implemented as a separate component of a switch or network element (e.g., a software component compared to switch hardware). In other examples, the control plane can be considered the portion of the network element where the signaling traffic can be carried, whereas a data plane can be considered a forwarding or carrier plane that carries the network user traffic.

ND Snooping addresses several ND attacks. In one example, an attacker could send forged Neighbor Advertisement packets claiming the ownership of a valid device's IPv6 address to redirect the traffic meant for the valid host from a router/gateway to them. In another example, an attacker could also send forged Router Advertisement packets providing wrong network configuration information to other hosts in the network. To make sure that a valid device or network device can move around the ports (e.g., moving from a cube at an office to a conference room), the ND Snooping feature verifies whether the device is still reachable on the older port. In one example, only if the host is no longer heard on the older port, the ND Snooping feature replaces the older host entry in the Binding State Table with the new device entry. In this example, the switch port is a binding anchor for the device entry.

However, ND snooping has some limitations. For example, this approach leaves potential for another type of attack, such as a denial of service attack by flooding ND packets. A rate limit for ND packets can be implemented at switches to limit the rate of ND packets processed at a port, however an attacker may still send the ND packets infinitely if it is capable of continually changing ports. As a result, the ND snooping feature would cause the network appliance on the control plane to verify the reachability of the devices on the older ports for every packet sent by the attacker. This could flood the control plane with packets, which may slow down or stop the network.

Accordingly, examples described herein are directed at enhancing usage of ND Snooping to protect the control plane as well as allowing a valid device to move across the different ports in the same network. Though examples provided herein specifically refer to IPv6, it is contemplated that this approach can be used with any IP version that is capable of using ND as described herein.

In one example, the Neighbor Discovery protocol is the ND Protocol related to IPv6. The IPv6 ND Protocol uses five types of Internet Control Message Protocol (ICMPv6) messages: Neighbor Solicitation, Neighbor Advertisement, Router Solicitation, Router Advertisement, and Router Redirect. These messages can be used to achieve functions such as address resolution, neighbor reachability detection, router/prefix discovery, address auto-configuration, redirection, etc. In one example, Neighbor Solicitation messages are used by device nodes on the network to determine the link layer address of a neighbor, or to verify that a neighbor is still reachable via a cached link layer address. In another example, Neighbor Advertisement messages can be used by device nodes to respond to a Neighbor Solicitation message. Moreover, in a further example, a Router Solicitation message can be used by a host node to locate routers on an attached link. Routers that forward packets not addressed to them can generate and send out Router Advertisements. A Router Advertisement message can be used by routers to advertise their presence together with various link and Internet parameters either periodically, or in response to the Router Solicitation message. Further, in one example, a Router Redirect message can be used to inform host nodes of a better first hop router for a destination.

The messages can be copied by a switch receiving the message and sent, via a control plane, to a network appliance. In some examples, copying only occurs once per packet (e.g., when received at an edge port). In this example, the snooping functionality can be enabled on edge/access layer switches but not on distribution or core layer infrastructure devices. The copying occurs at a switch based on a rule (e.g., looking at particular edge ports for ND packets). In other examples, each network element can have the functionality enabled. Part of the message can include identification information about the device sending the message, for example, an IP address and Media Access Control (MAC) address. Further, the packet copied and sent may include further metadata, such as a port in the network that initially received the message.

The network appliance can receive the ND packets on the control plane. A global configurable probe limit can be maintained. In one example, this probe limit value is the count on the number of attempts that the network appliance can try to detect the reachability of the device in a previously bound port when a possible attacker on different port sends Neighbor Solicitation (or other ND) packets matching the IPv6 address and MAC address of the device. In one example, when a previous verification is still in progress of presence of the device is on the port, further probes are not attempted irrespective of number of NS or NA packet received from the possible attacker (or possible moved valid device).

A probe counter is maintained in the BST for every binding entry. This counter is incremented whenever a probe is done to detect the reachability of a device on the prior port and if the device is still reachable on the prior port. The separate counter can be used for each IP address on the BST. In one example, the counter can be reset at every time the BST entry is refreshed. For example, when a lease timer expires or if there was a valid device movement to a new port. During the interval of lease-time, if the probe counter reaches the max-probe-limit, an attack is detected. As noted, the probe counter can also be reset if the device is detected to be moved to a new port.

In one example, a port map can be maintained in the BST for each binding entry. This port map is to keep track of the ports on which such potential attacks are experienced. After the max-probe-limit is reached, all the ports of this port map will be tracked as the ones on which attack is experienced. An informational message can be provided to an administrator, for example, using a Simple Network Management Protocol (SNMP) trap and/or a log message or email indicating the ports on which the attack is experienced. Moreover, the ports can be black listed so that further ND packets claiming the ownership of the valid IP device will be ignored. In some examples, the ports associated with the attack can be blocked from data communications. This can be implemented on the data plane. For example, a rule can be implemented so that each port identified as associated with attack is affected. In one example, the rule can indicate that ND packets from these ports are not forwarded to the control plane or are simply dropped. In another example, the rule can further indicate that ND packets on these ports with the IP address and/or MAC address of the valid IP device are blocked, but other ND packets may continue to be processed.

If the valid device is moving to a port on which the attack is not experienced, on receiving a NS packet from the valid device, a probe to detect the reachability on the previous port occurs and upon no reply from the valid device on the previous port, the device will be allowed to move. In one example, this can be used to trigger a reset of the probe counter and/or the blacklisted ports associated with the attack. In some examples, the resetting of the blacklisted ports can be configurable based on one or more triggers (e.g., the verified movement of the device to a new port, a manual input, lease expiration and renewal, etc.). As such, an administrative command can be provided to clear a specific port or the whole blacklisted set of ports from the port map maintained. As such, the administrator can move the device to the port(s) on which the attack was originally experienced. Similarly, an administrative command can be provided to clear the probe counter for a specific IP address. In some examples, the blacklisting can be implemented on the data plane via a set of rules.

Figure 2:
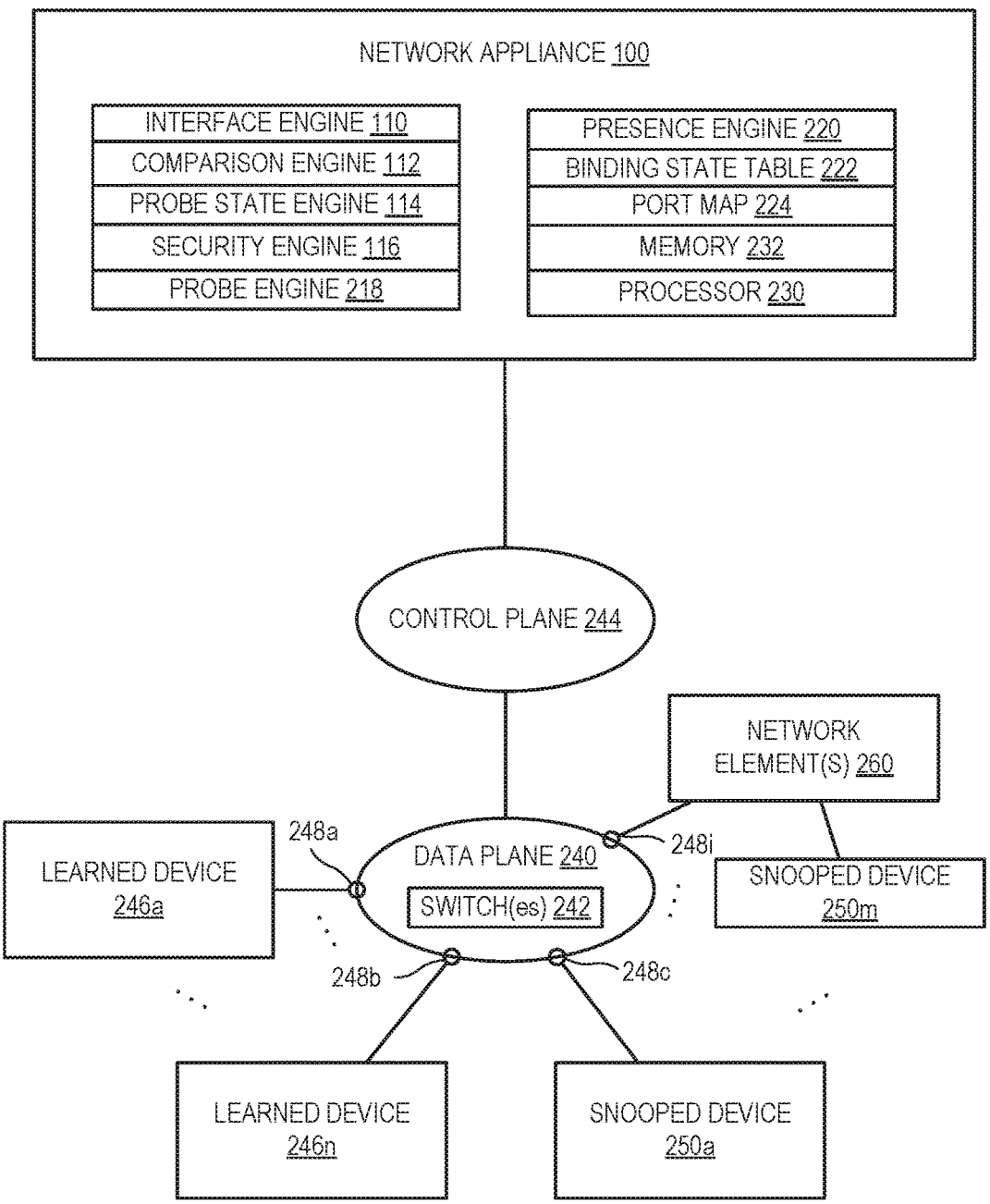
FIG. 2 is a block diagram of a network system including a network appliance capable of performing a security action based on a probe counter associated with a network discovery packet, according to one example.

FIG. 1 is a block diagram of a network appliance capable of performing a security action based on a probe counter associated with a network discovery packet, according to an example. FIG. 2 is a block diagram of a network system including a network appliance capable of performing a security action based on a probe counter associated with a network discovery packet, according to one example.

In one example, network appliance 100 can include an interface engine 110, a comparison engine 112, a probe state engine 114, and a security engine 116. In another example, the network appliance 100 can also include a probe engine 218, a presence engine 220, a binding state table 222, a port map 224, a processor 230, and/or memory 232.

The network appliance 100 can be implemented as part of network system 200. In one example, the control plane 244 can represent a software implemented part of a network element. As such, in the example, a control plane 244 portion of the network 200 can be a considered a software implemented part of a network element in the network. The data plane 240 can be implemented using a network fabric that may include wired and wireless network elements, such as switches 242, routers, bridges, wireless access points, and the like. In certain examples, a switch 242 or network switch is a computer networking device that connects devices together in a computer network by using packet switching to forward data to a destination device. In some examples, the network appliance 100 can be implemented as part of the network elements, where the network element has a data plane and a control plane. A switch can also act as or be included in a bridge, a router, other network elements, etc. Individual ports 248a, 248b, 248c-248i can be tracked on the network elements such as switches that can be controlled via the control plane 244. In some examples, other network elements 260 (e.g., other switches or access points that are not controlled via the control plane 244) can be connected and devices can be associated with the corresponding port on the data plane 240. For example, learned device 246a can be associated with port 248a, learned device 246n can be associated with port 248b, snooped device 250a can be associated with port 248c and snooped device 250m can be associated with port 248i.

The network appliance 100 can track devices on the data plane 240. A binding state table 222 can be used to track the devices. In one example, for each device, an IP address, a MAC address, and an associated port 248 can be kept. In some examples, the binding state table 222 can be implemented as a distributed system, where individual network elements may be responsible for part of the binding state table. Further, in some examples, a probe state, a probe counter, and/or a port map 224 of possible attacks can be kept in the binding state table 222 or in an associated data structure. The presence engine 220 can be used to process neighbor discovery packets and update the binding state table 222. Various approaches can be used to learn bindings, such as via authentication via a comparison to a whitelist of MAC addresses, Neighbor Advertisements, etc.

Learned devices 246a-246n can be considered devices on the data plane 240 that have been verified and placed on the binding state table. The binding state table 222 can include the IP address (e.g., IPv6 address), MAC address, and Port for each of the verified learned devices 246. Further, a snooped device 250a-250m is a device that has sent a neighbor discovery packet that has been snooped. In some examples, the snooped devices can also be previously learned devices. Verification can occur using various approaches, such as comparison of a MAC address to a whitelist of valid devices, checking the binding state table, etc.

When a new device is added to a port on the data plane 240 and sends out a neighbor discovery packet, the new device can be considered a snooped device such as snooped devices 250a-250n. In one example, a snooped device 250 sends out a neighbor discovery packet. A network element on the data plane 240 receives the neighbor discovery packet at a port 248. A copy of the packet as well as metadata regarding the port 248 is provided to the network appliance 100, via the control plane 244, by the network element. In some examples, the network element may include logic that enables it to send a copy of a neighbor discovery packet to the network appliance 100 via the control plane 244. In some examples, particular neighbor discovery packets (e.g., neighbor solicitation or neighbor advertisement packets) can be selected to be sent while other neighbor discovery packets are not sent. This can be based on a rule enabled on the network elements and controlled by the network appliance 100 and/or another appliance such as a networking controller. In one example, the neighbor discovery packet copy can include the metadata (e.g., port information) as well as the original packet. In some examples, the metadata can be added by logic on the network element.

An interface engine 110 on the network appliance 100 receives the copy of the neighbor discovery packet. In one example, the interface engine 110 can use a network interface card (e.g., a network interface card with an Ethernet connection) to interface with the control plane 244. The network appliance 100 can determine that the packet is a neighbor discovery packet and which type by looking at a type field in the packet. In response to receiving the packet, the comparison engine 112 can be used to compare the identification information in the neighbor discovery packet copy including the IP address, the MAC address, and a port (e.g., port 248a) to the binding state table 222. This can be looked up, for example, via the IP address.

If the MAC address does not match, the MAC address on the table for the IP address, the packet can be assumed to come from an unauthorized snooped device 250. In some examples, the unauthorized snooped device's packet can be ignored.

In another example, if the IP address and MAC address match the binding state table 222 entry, but the associated port is different from the port of a corresponding learned device (e.g., learned device 246a), further analysis can be performed. In this scenario, the learned device 246a may have moved and is the snooped device 250 or the learned device 246a is still present on the learned port 248a and the snooped device 250 may be considered unauthorized (e.g., because the snooped device 250 is an attacker).

In one example, the probe state engine 114 can determine a state of a probe counter associated with the binding state table 222 entry (e.g., the probe counter associated with the IP address). In one example, the state can be a limit state, where an attack has been identified for the IP address or a non-limit state, where an attack is not associated identified with the IP address. In one example, the state can be based on a comparison of the probe counter with a threshold that is associated with an attack. The threshold can be configured by an administrator of the network.

A security engine 116 can determine a security action to perform based on the state. Different security actions can be taken based on the state as well as based on other rules, for example, as part of decision trees. As such, the security action can include probing, blacklisting, identifying attacks, sending messages associated with attacks, etc. based, at least in part, on the state. In one example, the state is not at the limit state. In one example, the state is considered not to be in the limit state if the probe counter is below a threshold limit. In this example, the security action can include causing probing of a previous port 248a associated with the IP address on the binding state table entry to determine whether an expected device (e.g., learned device 246a) is still present at the previous port 248a. If the expected device is still present, it can indicate that the snooped device 250 is unauthorized and may be an attacker. If the expected device is not still present, it can indicate that the expected device may have moved and may be the snooped device 250.

In one example, the probe engine 218 determines that the expected device is still present on the previous port 248a. In response, the probe engine 218 can increment the probe counter based on the determination that the expected device is still present on the previous port 248a. The port associated with the neighbor discovery packet copy can be added to a port map associated with the binding state table entry as a potentially attacked port (e.g., if the port is not already identified in the port map).

Further, the probe state engine 114 can check the probe state after the increment. In one example, the probe state engine 114 can determine that the probe counter has reached the limit state. As such, the probe state engine 114 can determine that an attack is present on the network based on the limit state. As noted above, the port associated with the neighbor discovery packet copy can be added to a port map associated with the potential attack if not already present. As such, the port can be identified in the port map as associated with the attack.

In one example, in response to identifying the attack, the security engine 116 can send a message to identify the attack as part of the security action. The message can include the port map of the ports associated with the attack (or potential attack). In some examples, the port map is maintained with the binding state table entry for each IP address and can identify each port that requested the IP address, but the previously bound expected device was still present on the port identified in the binding state table entry. The binding state table entry, including the port map can be reset as further described herein.

In another example, the presence engine 220 can reset the probe counter, the state, and/or the port map for a binding state table entry in response to a determination that the entry associated with the IP address on the binding state table has expired. This approach can be used to flush stale attack identifications.

In a further example, the probe engine 218 may determine that the expected device is not present on the previous port 248a. In response to this determination, the probe counter can be reset. Further, the associated port map can be reset. A new binding to the port associated with the snooped device 250 can be recorded to identify that the expected device has moved to the new port location.

In one example, if the state is in a limit state, the security action can include looking at a port map associated with the binding state table entry for the IP address to determine whether the port 248 associated with the snooped device 250 is associated with an attack. If the port is associated with an attack, the security action can include ignoring the neighbor discovery packet. This can include not probing the associated learned device 246a, having the associated data plane element drop discovery packets from the snooped device, combinations thereof, etc.

In one example, when the state is in the limit state, a rule can be added to identify the ports associated with attack to perform a security action (e.g., block, drop, etc.). Further, the rule can be implemented in a manner such that Neighbor Discovery packets identified as being on a port that is associated with the attack and the identified IP address are ignored. The rule can be implemented on the data plane. As such, these packets are not forwarded to the control plane, and thus the control plane is not flooded.

In another example, if the port has not been identified as associated with the attack, the probe engine 218 can be used to probe for an expected device (e.g., the learned device 246a) on the associated port 248a in the binding state table using a similar approach as if the probe state was not at the limit state.

The size of the probe counter can be variable based on the size of the network system 200 and/or preferences of an administrator. In one example, the size can be based on an 8 bit integer variable (e.g., 0-255). In this example, the administrator can set the limit threshold to a particular number, (e.g., 10, 16, 32, etc.). The limit threshold can be set to a default number (e.g., 10, 16, 32, etc.) and the administrator can be allowed to change it.

In some examples, the network system 200 separates the control plane 244 from the data plane 240, such that a network controller (not shown) can make decisions regarding where and how network traffic is to be sent while the data plane 240 can be programmed by the network controller to forward and manipulate the traffic. In certain examples, there is also an application plane consisting of one or more software defined networking applications whose functionality can be implemented by the network controller or another network appliance such as network appliance 100.

In other examples, the control plane and data plane are combined in a network device (e.g., an Ethernet switch, router, multilayer switch, etc.). In such cases, the network appliance 100 referred to herein is implemented by the control plane of the network device, which can include a processing element (e.g., a central processing unit), memory, and storage (e.g., flash or disk memory).

As used herein, the term network controller can, for example, refer to any suitable entity that handles control and management functions of a network. It is appreciated that, certain networks may allow for the decoupling of traffic routing control decisions (e.g., which port of a given switch should be used to forward traffic en route to a given destination) from the network's physical infrastructure. In some examples, the network controller can implement features of the network appliance 100. In other examples, the network appliance 100 can be another device on the control plane 244 that is able to provide the functionality described herein.

Network nodes within a network environment can forward traffic along a data path based on metadata within the traffic. For example, traffic in the form of a packet can be received at a switch (or another suitable intermediary network node such as an access point). For consistency, the industry term "packet" is used throughout this description, however, it is appreciated that the term "packet" as used herein can refer to any suitable protocol data unit (PDU). Such a packet can, for example, include payload data as well as metadata in the form of control data. Control data can, for example, provide data to assist the network node with reliably delivering payload data. For example, control data can include network addresses for source and destination nodes (e.g., learned devices 246, snooped devices 250, etc.), error detection codes, sequencing information, packet size of the packet, a time-to-live (TTL) value, etc. In contrast, payload data can include data carried on behalf of an application for use by source and destination nodes.

The engines 110, 112, 114, 116, 218, 220 include hardware and/or combinations of hardware and programming to perform functions provided herein. Moreover, functionality attributed to a particular engine may also be implemented using another engine.

A processor 230, such as a central processing unit (CPU) or a microprocessor suitable for retrieval and execution of instructions and/or electronic circuits can be configured to perform the functionality of any of the engines described herein. In certain scenarios, instructions and/or other information, such as topology, rules, binding state tables, port maps, etc., can be included in memory 232 or other memory. Moreover, in certain implementations, some components can be utilized to implement functionality of other components described herein.

The communication networks can use wired communications, wireless communications, or combinations thereof. Further, the communication networks can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, the communication network can be in the form of a direct network link between devices. Various communications structures and infrastructure can be utilized to implement the communication network(s).

By way of example, devices can communicate with each other and other components with access to the respective networks via a communication protocol or multiple protocols. A protocol can be a set of rules that defines how nodes of the respective networks interact with other nodes. Further, communications between network nodes can be implemented by exchanging discrete packets of data or sending messages. Packets can include header information associated with a protocol (e.g., information on the location of the network node(s) to contact) as well as payload information.

One or more of the devices can communicate with other devices via one or more of the networks.

Figure 3:
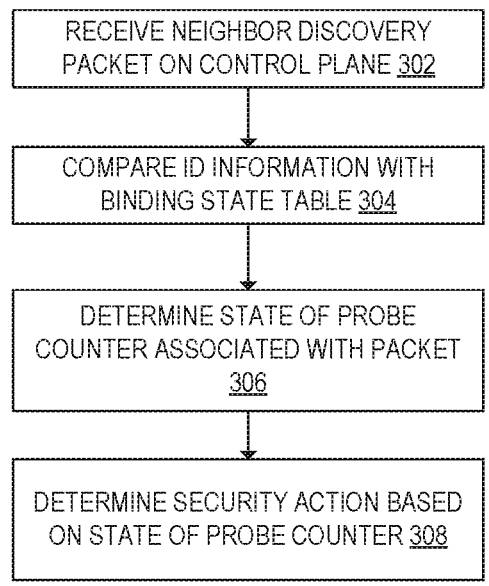
FIG. 3 is a flowchart of a method for determining a security action to take upon receiving a neighbor discovery packet based on a state of a probe counter, according to an example.
Figure 4:
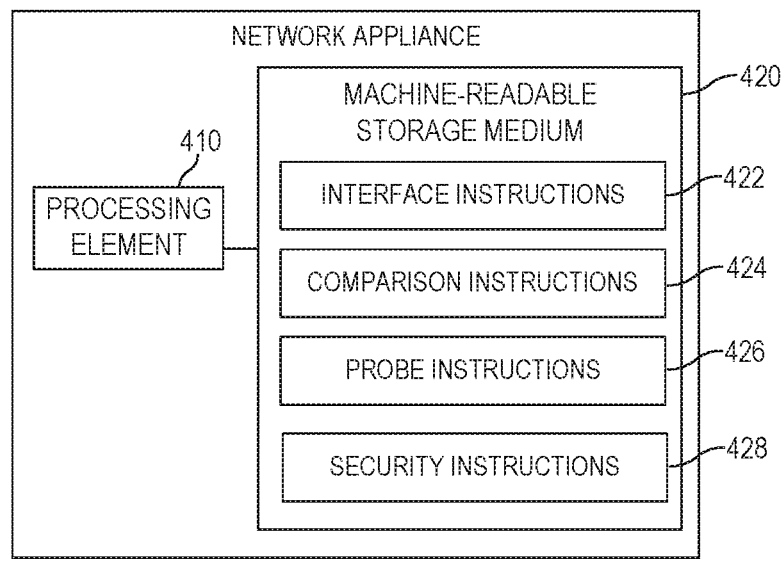
FIG. 4 is block diagram of a network appliance capable of updating a state of a probe counter associated with a neighbor discovery packet, according to an example.

FIG. 3 is a flowchart of a method for determining a security action to take upon receiving a neighbor discovery packet based on a state of a probe counter, according to an example. FIG. 4 is block diagram of a network appliance capable of updating a state of a probe counter associated with a neighbor discovery packet, according to an example. The network appliance 400 includes, for example, a processing element 410, and a machine-readable storage medium 420 including instructions 422, 424, 426, 428 for providing security to a network system. Network appliance 400 may be a computing system, for example, a server, a workstation, a notebook computer, a slate computing device, or any other computing device capable of performing the functionality described.

As noted above, a networking system can be in a state when some devices have been authenticated on the networking system and are learned to be at a particular port. The network appliance 400 can keep track of these learned devices in a binding state table. In one example, the binding state table includes at least an IP address (e.g., an IPv6 address), a MAC address, and an originating port for each learned device as a record entry. In another example, each record entry has associated with it a probe counter as described above and a port map. In one example, the port map can identify each port where an attempt was made to use a neighbor discovery packet (or a particular type of neighbor discovery packet) by a device that matched the IP address and MAC address on the binding state table, but did not match the port in the record and a probe indicated that the device that was expected (matching IP address and MAC address) was still present at the previous port. As noted above, the probe counter and port map can be reset in various ways.

As noted above, when a device on the network sends a neighbor discovery packet out, a switch on the network can send a copy of the packet to the network appliance 400 via a control plane as part of a snooping rule being implemented on the switch. Moreover, in one example, the switch can wait for feedback from the network appliance 400 before doing anything further with the packet. For example, if the network appliance 400 deems that the packet has been validated, the packet can continue to be processed and forwarded, however, if there is an issue, another action can be taken (e.g., dropping or ignoring the packet and possibly future packets from the device and/or other devices that show up on the port associated with the packet). In another example, the packet can be dropped based on a timer if no response is received from the network appliance 400.

Method 300 can start at 302, where interface instructions 422 can be executed by processing element 410 to receive the neighbor discovery packet on the control plane. Method 300 shows the example of receiving one packet, but it is contemplated that this approach may be performed for each neighbor discovery packet that gets sent to the network appliance 400.

As noted above, the neighbor discovery packet copy can include identification information about the snooped device. The identification information can include an IP address, a MAC address, and port information. At 304 the identification information can be compared to the binding state table. The processing element 410 can execute comparison instructions 424 to determine that the IP address and MAC address match the binding state table, but the port information does not match a previous port recorded in the binding state table.

At 306, probe instructions 426 can be executed to determine a state of the probe counter that is associated with the IP address as described above. At 308, security instructions 428 can be executed to determine a security action to perform based on the state.

In one example, the state can be determined to be in a limit state. Based on the limit state determination and a port map, the neighbor discovery packet can be ignored. In one example, ignoring can include indicating to a switch with the port that packets (e.g., all packets, neighbor discovery packets, etc.) on the port should be dropped. In another example, ignoring can include the network appliance not performing an action on the packet and the switch with the port dropping the packet because the port did receive instructions from the network appliance 400.

Figure 5:
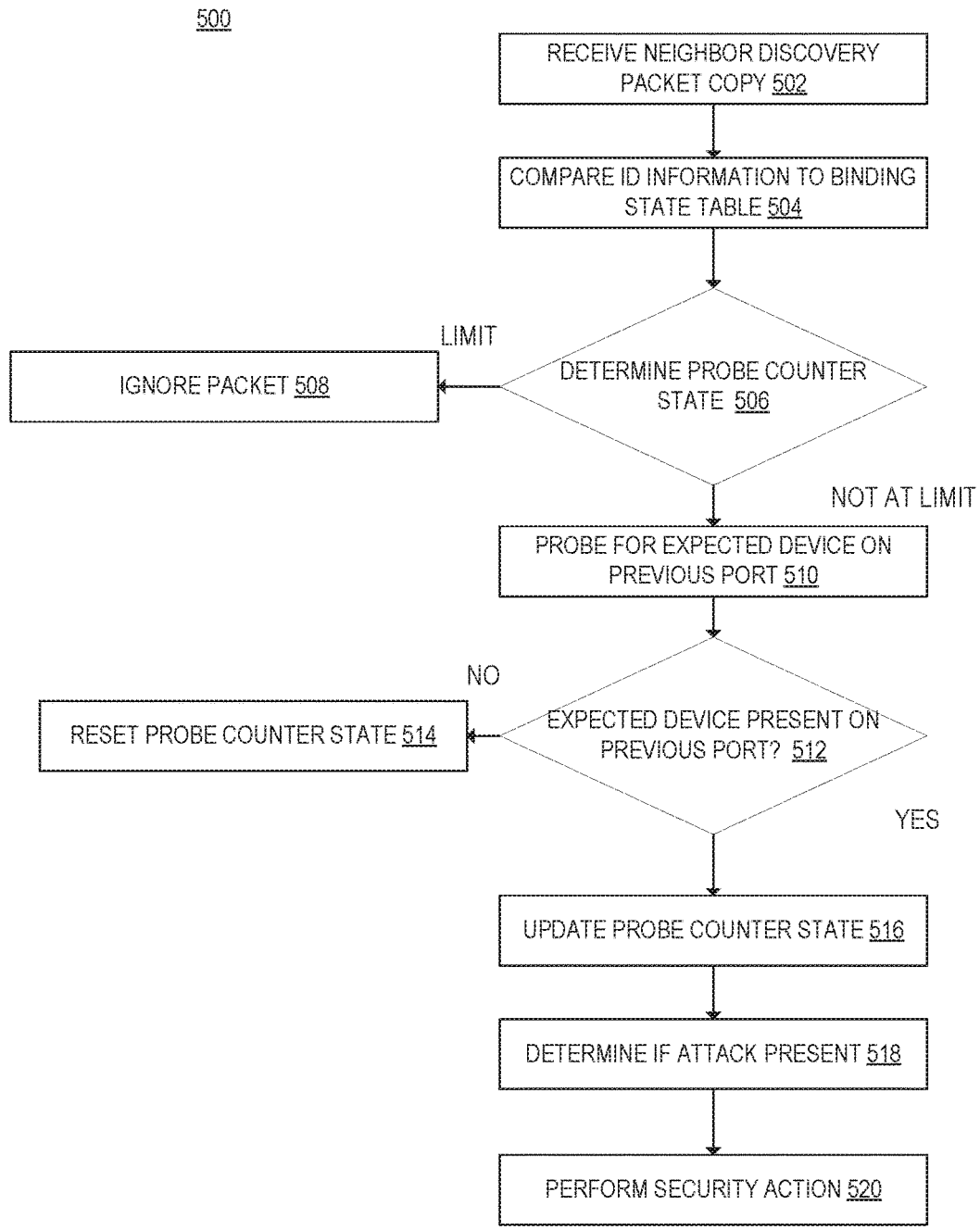
FIG. 5 is a flowchart of a method for performing a security action upon receiving a neighbor discovery packet based on a state of a probe counter, according to an example.

FIG. 5 is a flowchart of a method for performing a security action upon receiving a neighbor discovery packet based on a state of a probe counter, according to an example. As with method 300, method 500 can be implemented using network appliance 400.

As with method 300, a networking system can be in a state when some devices have been authenticated on the networking system and are learned to be at a particular port. The network appliance 400 can keep track of these learned devices in a binding state table. In one example, the binding state table includes at least an IP address (e.g., an IPv6 address), a MAC address, and an originating port for each learned device as a record entry. In another example, each record entry has associated with it a probe counter as described above and a port map. In one example, the port map can identify each port where an attempt was made to use a neighbor discovery packet (or a particular type of neighbor discovery packet) by a device that matched the IP address and MAC address on the binding state table, but did not match the port in the record and a probe indicated that the device that was expected (matching IP address and MAC address) was still present at the previous port. As noted above, the probe counter and port map can be reset in various ways.

As noted above, when a device on the network sends a neighbor discovery packet out, a switch on the network can send a copy of the packet to the network appliance 400 via a control plane. Moreover, the switch can wait for feedback from the network appliance 400 before doing anything further. For example, if the network appliance 400 deems that the packet has been validated, the packet can continue to be processed and forwarded, however, if there is an issue, another action can be taken (e.g., dropping or ignoring the packet and possibly future packets from the device and/or other devices that show up on the port associated with the packet).

Method 500 can start at 502, where interface instructions 422 can be executed by processing element 410 to receive the neighbor discovery packet on the control plane. As with method 300, method 500 shows the example of receiving one packet, but it is contemplated that this approach may be performed for each neighbor discovery packet that gets sent to the network appliance 400.

As noted above, the neighbor discovery packet copy can include identification information about the snooped device. The identification information can include an IP address, a MAC address, and port information. At 504 the identification information can be compared to the binding state table. The processing element 410 can execute comparison instructions 424 to determine that the IP address and MAC address match the binding state table, but the port information does not match a previous port recorded in the binding state table.

At 506, probe instructions 426 can be executed to determine a state of the probe counter that is associated with the IP address as described above. If the probe counter is at a threshold limit and is in a limit state as described above, a port map can be consulted as described previously to determine whether the port of the snooped device is associated with an attack. If so, the neighbor discovery packet can be ignored (508).

If the probe counter state indicates, at 506, that it is not at the threshold limit indicating an attack, at 510, the probe instructions 426 can be executed by processing element 410 to probe for an expected device on the previous port identified in the binding state table. Probing can be considered part of at least one security action that can be performed in response to receiving the neighbor discovery packet. In one example, the expected device is determined to be at the previous port if there is a device at the port with the same IP address and MAC address (512). This can be based on a response received in response to the probe.

In one example, if there is no response to the probe, then the expected device is not on the port. As such, in the example, the snooped device can be assumed to be the valid device moving ports. Further, at 514, the probe counter state can be reset as described above. Moreover, the neighbor discovery packets received by the switch can continue to proceed without impediment. Further, the binding state table can be updated to refer to the new port that is associated with the snooped device.

If the expected device is found to be on the previous port, the probe counter is updated at 516 (e.g., by incrementing the probe counter). At 518, security instructions 428 can be executed to determine whether an attack is present based on the updated probe limit. The probe instructions 426 can be executed to determine whether the probe counter reached a limit state. If the probe counter reached the limit state, an attack can be considered present.

At 520, a security action can be performed. Because the expected device is on the previous port, the neighbor discovery packet is not processed. Moreover, the port associated with the snooped device can be added to a port map associated with the binding state table entry for the IP address. As noted above, the port map can be used to determine which ports may be affected by an attack when an attack is determined to be present. In some examples, the ports in the network system can be enumerated and identified in such a manner in the port map. In other examples, the ports can be identified by an identifier for the network element (e.g., switch) that the port is on and a port number for that network element.

In one example, an attack is not deemed to be present because the limit state has not been reached. In another example, an attack can be identified as occurring because the probe state is at the limit state. In this example, the security action can further include sending a message to identify the attack. The message can include the port map of the ports associated with the attack (or potential attack). In some examples, the port map is maintained with the binding state table entry for each IP address and can identify each port that requested the IP address, but the previously bound expected device was still present on the port identified in the binding state table entry.

In another example, when the state is in the limit state, a rule can be added to identify the ports associated with attack to perform a security action (e.g., block, drop, etc.) on the data plane. Further, the rule can be implemented in a manner such that Neighbor Discovery packets identified as being on a port that is associated with the attack and the identified IP address are ignored. The rule can be implemented on the data plane. As such, these packets are not forwarded to the control plane, and thus the control plane is not flooded.

Processing element 410 may be, one or multiple central processing unit (CPU), one or multiple semiconductor-based microprocessor, one or multiple graphics processing unit (GPU), other hardware devices suitable for retrieval and execution of instructions stored in machine-readable storage medium 420, or combinations thereof. The processing element 410 includes a physical device. Moreover, in one example, the processing element 410 may include multiple cores on a chip, include multiple cores across multiple chips, multiple cores across multiple devices (e.g., if the network appliance 400 includes multiple node devices), or combinations thereof. Processing element 410 may fetch, decode, and execute instructions 422, 424, 426, 428 to implement security features for the network. As an alternative or in addition to retrieving and executing instructions, processing element 410 may include at least one integrated circuit (IC), other control logic, other electronic circuits, or combinations thereof that include a number of electronic components for performing the functionality of instructions 422, 424, 426, 428.

Machine-readable storage medium 420 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 420 may be encoded with a series of executable instructions for using probe counters to improve security at a networking system.

In some examples, the network appliance 400 can be integrated as part of a switch or other network element. For example, the network appliance 400 can represent a control plane of the network element that is controlled via software, while the data plane of the network element is implemented using separate hardware logic (e.g., one or more application specific integrated circuits (ASICs)). In some examples, the binding state table can be distributed between multiple network elements and a communications approach can be used to coordinate information transfer. In other examples, the binding state table can be centralized.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described. Thus, features described with reference to one or more implementations can be combined with other implementations described herein.

As used herein, "logic" is an alternative or additional processing resource to perform a particular action and/or function, etc., described herein, which includes hardware, e.g., various forms of transistor logic, application specific integrated circuits (ASICs), etc., as opposed to machine executable instructions, e.g., software firmware, etc., stored in memory and executable by a processor. Further, as used herein, "a" or "a number of" something can refer to one or more such things. For example, "a number of widgets" can refer to one or more widgets. Also, as used herein, "a plurality of" something can refer to more than one of such things.

We claim:

1. A network appliance comprising:
a memory; and
one or more processors, wherein the one or more processors are configured to perform each function of a plurality of engines stored in the memory, wherein the plurality of engines comprise:
an interface engine to receive a copy of a neighbor discovery packet on a control plane of a network that originated at a first port on a data plane of the network,
wherein the neighbor discovery packet copy includes identification information including: an internet protocol address, a media access control (MAC) address, and the first port;
a comparison engine to compare the identification information to a binding state table to determine that the internet protocol address and the MAC address matches the binding state table, but the first port does not match a previous port on the binding state table for the internet protocol address, and
wherein the binding state table further comprises a port map that comprises a list of ports on which potential attacks are transmitted by one or more snooped devices, and wherein copies of packets corresponding with the potential attacks transmitted by the one or more snooped devices are received by the interface engine;
a probe state engine to determine a state of a probe counter associated with the internet protocol address, wherein ports on which potential attacks are transmitted are tracked when the probe counter reaches a max-probe-limit; and
a security engine to determine a security action to perform based on the state.

2. The network appliance of claim 1, further comprising:
a probe engine to probe the previous port to determine whether an expected device is still present at the previous port.

3. The network appliance of claim 2, wherein the probe engine is further to determine that the expected device is still present on the previous port and is to increment the probe counter based on the determination that the expected device is still present on the previous port.

4. The network appliance of claim 3, wherein the probe state engine is further to determine that the probe counter has reached a limit state, and determine that an attack is present on the network based on the limit state.

5. The network appliance of claim 4, wherein the first port is identified in the port map associated with the attack.

6. The network appliance of claim 5, wherein the security engine is further to send a message to identify the attack including the port map.

7. The network appliance of claim 5, further comprising:
a presence engine to reset the probe counter in response to a determination that an entry associated with the internet protocol address on the binding state table has expired.

8. The network appliance of claim 2, wherein the probe engine is to determine that the expected device is not present on the previous port and to reset the probe counter.

9. The network appliance of claim 1, wherein the state is at a limit state and the security action includes ignoring the neighbor discovery packet.

10. A method comprising:
receiving, at a network appliance, a copy of a neighbor discovery packet on a control plane of a network that originated at a first port on a data plane of the network,
wherein the neighbor discovery packet copy includes identification information including: an internet protocol address, a media access control (MAC) address, and the first port;
comparing the identification information to a binding state table to determine that the internet protocol address and the MAC address match the binding state table, but the first port does not match a previous port on the binding state table for the internet protocol address, and
wherein the binding state table further comprises a port map that comprises a list of ports on which potential attacks are transmitted by one or more snooped devices, and wherein copies of packets corresponding with the potential attacks transmitted by the one or more snooped devices are received by an interface engine of the network appliance;
determining a state of a probe counter associated with the internet protocol address, wherein ports on which potential attacks are transmitted are tracked when the probe counter reaches a max-probe-limit; and
determining a security action to perform based on the state.

11. The method of claim 10, further comprising:
determining that the state is a limit state; and
based on the limit state determination and the port map including the first port, ignoring the neighbor discovery packet.

12. The method of claim 11, further comprising:
resetting the probe counter in response to a determination that an entry associated with the internet protocol address on the binding state table has expired,
wherein the neighbor discovery packet includes one of: a neighbor solicitation packet and a neighbor advertisement packet.

13. The method of claim 10, further comprising:
as part of the security action, probing for an expected device on the previous port;
determining that the expected device is still present on the previous port based on the probe;
incrementing the probe counter based on the determination that the device is still present on the previous port;
determining that the probe counter has reached a limit state;
determining that an attack is present on the network based on the limit state; and
identifying the first port in the port map as associated with the attack.

14. The method of claim 10, further comprising:
as part of the security action, probing an expected device on the previous port; and
resetting the probe counter based on a determination that the expected device is not present on the previous port.

15. A non-transitory machine-readable storage medium storing instructions that, if executed by a physical processing element of a network appliance, cause the network appliance to:

receive a neighbor discovery packet copy on a control plane of a network that originated at a first port on a data plane of the network, wherein the neighbor discovery packet copy includes identification information including: an internet protocol address, a media access control (MAC) address, and the first port;

compare the identification information to a binding state table to determine that the internet protocol address and the MAC address match the binding state table, but the first port does not match a previous port on the binding state table for the internet protocol address, and wherein the binding state table further comprises a port map that comprises a list of ports on which potential attacks are transmitted by one or more snooped devices, and wherein copies of packets corresponding with the potential attacks transmitted by the one or more snooped devices are received by the interface engine;

probe for an expected device on the previous port, wherein ports on which potential attacks are transmitted are tracked when the probe counter reaches a max-probe-limit; and update a state of a probe counter associated with the internet protocol address.

16. The non-transitory machine-readable storage medium of claim 15, further comprising instructions that, if executed by the physical processing element, cause the network appliance to:

increment the probe counter as part of the update based on a determination that the expected device is still present on the previous port;

determine that the probe counter has reached a limit state;

determine that an attack is present on the network based on the limit state; and identify the first port in the port map as associated with the attack.

17. The non-transitory machine-readable storage medium of claim 16, further comprising instructions that, if executed by the physical processing element, cause the network appliance to:

reset the probe counter in response to a determination that an entry associated with the internet protocol address on the binding state table has expired; and reset identification of the attack.

18. The non-transitory machine-readable storage medium of claim 15, further comprising instructions that, if executed by the physical processing element, cause the network appliance to:

reset the probe counter as part of the update based on a determination that the expected device is not present on the previous port.

19. The network appliance of claim 1, wherein the max-probe-limit is transmitted to an administrator using a Simple Network Management Protocol (SNMP) trap.

20. The network appliance of claim 1, wherein the list of ports of the port map are black listed so that additional neighbor discovery packets associated with a port in the list of ports of the port map are ignored.

* * * * *